US012124629B2

(12) United States Patent
McDaniel et al.

(10) Patent No.: US 12,124,629 B2
(45) Date of Patent: Oct. 22, 2024

(54) HAND-DIRECTED SYSTEM FOR IDENTIFYING ACTIVITIES

(71) Applicants: Arizona Board of Regents on Behalf of Arizona State University, Tempe, AZ (US); Mozest Goldberg, Les Baux de Provence (FR)

(72) Inventors: Troy McDaniel, Gilbert, AZ (US); Mozest Goldberg, Les Baux de Provence (FR); Hemanth Kumar Demakethepalli Venkateswara, Tempe, AZ (US); Sethuraman Panchanathan, Gilbert, AZ (US); Vishnu Prateek Kakaraparthi, Tempe, AZ (US)

(73) Assignees: Mozest Goldberg, Les Baux de Provence (FR); Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 18/296,908

(22) Filed: Apr. 6, 2023

(65) Prior Publication Data
US 2023/0324993 A1    Oct. 12, 2023

Related U.S. Application Data

(60) Provisional application No. 63/328,121, filed on Apr. 6, 2022.

(51) Int. Cl.
*G06F 3/01* (2006.01)
*G06V 40/20* (2022.01)

(52) U.S. Cl.
CPC .............. *G06F 3/014* (2013.01); *G06V 40/28* (2022.01)

(58) Field of Classification Search
CPC ......... G06F 3/014; G06F 3/017; G06V 40/28; G06T 7/251
See application file for complete search history.

(56) References Cited

U.S. PATENT DOCUMENTS

| 11,635,823 | B1* | 4/2023 | Hu | G06F 3/017 345/156 |
| 2015/0363570 | A1* | 12/2015 | Hanina | G06F 18/00 348/143 |
| 2016/0306932 | A1* | 10/2016 | Fateh | H04N 23/57 |
| 2020/0012350 | A1* | 1/2020 | Tay | G06N 5/01 |
| 2022/0058439 | A1* | 2/2022 | Lee | A61B 5/681 |

* cited by examiner

*Primary Examiner* — Sardis F Azongha
(74) *Attorney, Agent, or Firm* — Polsinelli PC

(57) ABSTRACT

A system includes a wearable device including a camera. The system further includes at least one processor that can identify objects from video data generated by the camera and monitor how an individual wearing the wearable device manipulates the objects according to predetermined microactivities of interest to infer an action by the individual.

8 Claims, 19 Drawing Sheets

HAND-DIRECTED SYSTEM FOR IDENTIFYING ACTIVITIES

CROSS REFERENCE TO RELATED APPLICATIONS

This is a non-provisional application that claims benefit to U.S. Provisional Application Ser. No. 63/328,121, filed on Apr. 6, 2022, which is herein incorporated by reference in its entirety.

GOVERNMENT SUPPORT

This invention was made with government support under 1828010 awarded by the National Science Foundation. The government has certain rights in the invention.

FIELD

The present disclosure generally relates to wearable devices and computer vision; and particularly, to a system and associated method for hand-directed identification of activities using a wearable device configured to capture and interpret video data along a wrist towards the fingers to infer an activity.

BACKGROUND

Much of human activity involves the use of hands, often in conjunction with objects. However, activities such as pill-taking and remembering to take one's keys when leaving home are quite complex to model. For example, such activities involve finer micro-activities which can be performed in varying sequences. In addition, distractions and disturbances can arise when performing these activities so there are significant variations from individual to individual and even for an individual from one time to next.

Consider an individual taking pills. The basic sequence may require the individual to open a pillbox and to bring one or more pills at a time to the mouth. In some situations, the steps may be more complex. The pillbox may contain incorrect pills, the individual might drop a pill, the individual might interrupt the process to take food or a drink. In the case of the keys, one would have to monitor that the individual has the keys in hand, the pocket, or the bag when he reaches for the door.

There is a technical need for camera-based wearables for monitoring such human activity, however the aforementioned technical problems persist. It is with these observations in mind, among others, that various aspects of the present disclosure were conceived and developed.

SUMMARY

Aspects of the present disclosure can take the form of a computer-implemented system comprising a wearable device that includes at least one camera. The system further includes a processor in communication with the at least one camera and a memory, the memory including instructions, which, when executed, cause the processor to: identify an object within the video data by leveraging a first machine learning (ML) model trained to identify the object by focusing on a presence of the object in one or more image frames of the set of image frames relative to at least one region, the at least one region indicating a focus of attention that reduces search space and supports efficient identification of the object, detect a micro-activity from a subset of frames from the set of image frames of the video data by a second machine learning model trained to leverage detection of the object to distinguish the subset of frames from other frames of the set of image frames based on the micro-activity, the micro-activity indicative of some engagement by the individual with the object as detected, and infer an action by the individual, the action predetermined to include the object as identified and the at least one micro-activity as detected; among other features described herein.

In some examples, the processor infers an overall activity of taking a pill, wherein the overall activity defines: a first micro-activity to be performed by the hand, wherein the first micro-activity is grasping a pill, wherein an object associated with the first micro-activity is the pill; and a second micro-activity to be performed by the hand, wherein the second micro-activity is placing the pill within a mouth, wherein a first object associated with the second micro-activity is the pill and wherein a second object associated with the second micro-activity is the mouth.

In some examples, the overall activity defines: a third micro-activity to be performed by the hand, wherein the third micro-activity is reaching towards a pillbox, wherein an object associated with the third micro-activity is the pillbox; wherein the third micro-activity is performed prior to the first micro-activity.

In some examples, the overall activity defines: a fourth micro-activity to be performed by the hand, wherein the fourth micro-activity is opening the pillbox, wherein an object associated with the fourth micro-activity is the pillbox; wherein the fourth micro-activity is performed prior to the first micro-activity.

In some examples, the processor implements a heuristic understanding engine (HUE) that determines a success of the first micro-activity by evaluating if the pill is a correct pill or an incorrect pill.

In some examples, the HUE determines a success of the second micro-activity by evaluating whether the pill was placed inside the mouth or was not placed inside the mouth.

Aspects of the present disclosure can further take the form of a wearable device including a camera and a processor. The processor is configured to identify an object from video data derived from the camera by reference to a region concentrating on the object, detect a micro-activity from the video data, and infer an overall activity associated with the micro-activity and object.

Aspects of the present disclosure can further take the form of a computer-implemented method and/or tangible, non-transitory, computer-readable medium having instructions encoded thereon, the instructions, when executed by a processor, being operable to: identify an object, detect a micro-activity associated with the object, and infer an overall activity associated with the micro-activity and object.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
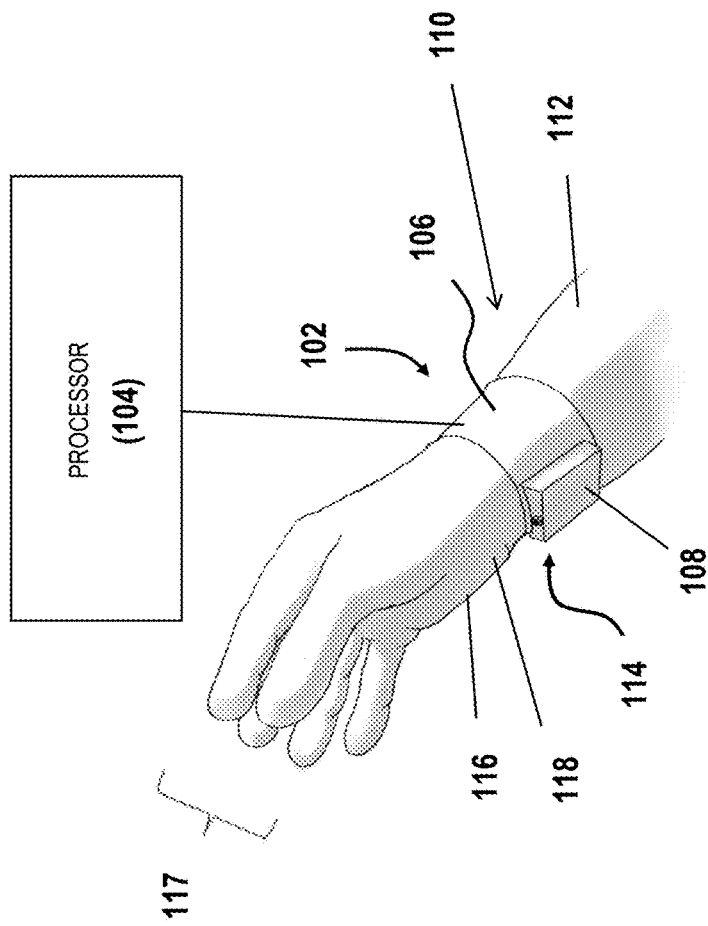
FIG. 1 is an illustration showing a wearable device including a camera on a ventral side of a wrist with the camera oriented towards the fingers.

Aspects of the present disclosure relate to a computer-implemented system and/or associated methods for identifying and/or monitoring hand activities via a wearable device. In some examples, the system includes a wearable device including at least one camera, and the wearable device is configured to generate video data including a set of image frames captured by the at least one camera from along a wrist of a hand of an individual towards fingers of the hand. The system further includes a processor in communication with the at least one camera and a memory, the memory including instructions, which, when executed, cause the processor to: identify an object within the video data by leveraging a first machine learning (ML) model trained to identify the object by focusing on a presence of the object in one or more image frames of the set of image frames relative to at least one region, the at least one region indicating a focus of attention that reduces search space and supports efficient identification of the object, detect a micro-activity from a subset of frames from the set of image frames of the video data by a second machine learning model trained to leverage detection of the object to distinguish the subset of frames from other frames of the set of image frames based on the micro-activity, the micro-activity indicative of some engagement by the individual with the object as detected, and infer an action by the individual, the action predetermined to include the object as identified and the at least one micro-activity as detected; among other features described herein.

The wearable device can be accompanied by a mobile application running on (or otherwise executable by) a tablet, mobile device, or other external computing device. Aspects of the present disclosure can also take the form of a device, and/or machine-readable instructions executable by a processor.

Introduction

While hands are continuously "moving," a system described in this disclosure is interested primarily in a subset of these movements relevant to the action being monitored. Reaching for an object is a fundamental movement that all humans perform. Typically, an individual performs these movements in a stereotypical way depending on the object of interest; for example, small objects such as pills are pinched in between the thumb and the index finger, and large objects such as a set of keys involve both the palms and fingers. Other movements of interest in the above example would be grasping and subsequently releasing a pill. The present disclosure describes a wearable system that exploits the physiological properties of object manipulation for designing efficient and effective algorithms to identify these movements. The present system is not limited to specific activities or applications such as the activity of pill taking and keys. Aspects of the present disclosure can be extended to assist blind individuals, gesture recognition, monitoring the elderly in daily tasks, locating missing objects, and tracking activities in medical and industrial environments.

To decipher human activity involving hands and objects, it is necessary to monitor the hand and its immediate environment simultaneously. Furthermore, it is necessary to break down the movement into manageable granular actions, which are described herein as "micro-activities". For example, in the case of pill-taking, one possible decomposition of (3) micro-activities is: moving towards a pill, grasping and displacing the pill-in-hand towards the mouth, and releasing the pill into the open mouth. If these three micro-activities are positively identified with high confidence levels, then one can safely conclude that the individual has commenced the process of taking the pill. A method implemented by the present system described in this disclosure can include a training phase. For example, using show and tell techniques, the individual performs and identifies the pill-taking activity with the device on the wrist monitoring the activity.

Systems and methods described herein build upon key observations in the manner in which individuals interact with objects. The role of the visual system is to locate and identify the object and guide the hand towards the object and, this at a subconscious level, so it appears to move autonomously towards the object and changes its pose as it approaches the object. As the hand touches, grasps and displaces or manipulates the object, the fingers assume different poses. The pattern of pose and motion of the hand depends upon the object and will vary from individual to individual and may also vary over time due to factors such as fatigue and lighting, amongst others. It is also noted that if a camera is correctly aligned, as the hand approaches the object of interest, the finger's apparent size remains constant; however, the image of the object of interest progressively increases in the camera's field of view. Furthermore, it is also noted that the object of interest is either settled within the fingers or is partially surrounded by the fingers as the hand approaches or withdraws from the object. These observations reduce the search space for identifying the object of interest and capturing finer details of finger movements.

Referring to FIG. 1, a system 100 for hand activity identification is shown. As indicated, the system 100 can generally include a wearable device 102 in communication with one or more of a processor 104. In some examples, the wearable device 102 includes an accessory 106 and a housing 108 in communication with the accessory 106. In non-limiting examples, the accessory 106 can include a strap, a wrap, or any other such component suitable for engaging a wrist 110 of an individual 112 as shown. The housing 108 can be mounted to the accessory 106, or otherwise coupled to the accessory 106 in the general position shown. The housing 108 can include a variety of non-limiting electrical devices, as further described herein. For example, the housing 108 includes a camera 114 that can capture data defining one or more digital images or digital video of the hand 116 (including fingers 117 and palm 118) of the individual 112, and such data can be leveraged for hand activity identification, as further described herein. Computing functions, processing, machine learning, or similar functionality described herein can be performed onboard the wearable device 102, externally via the processor 104, and/or combinations thereof.

Figure 2:
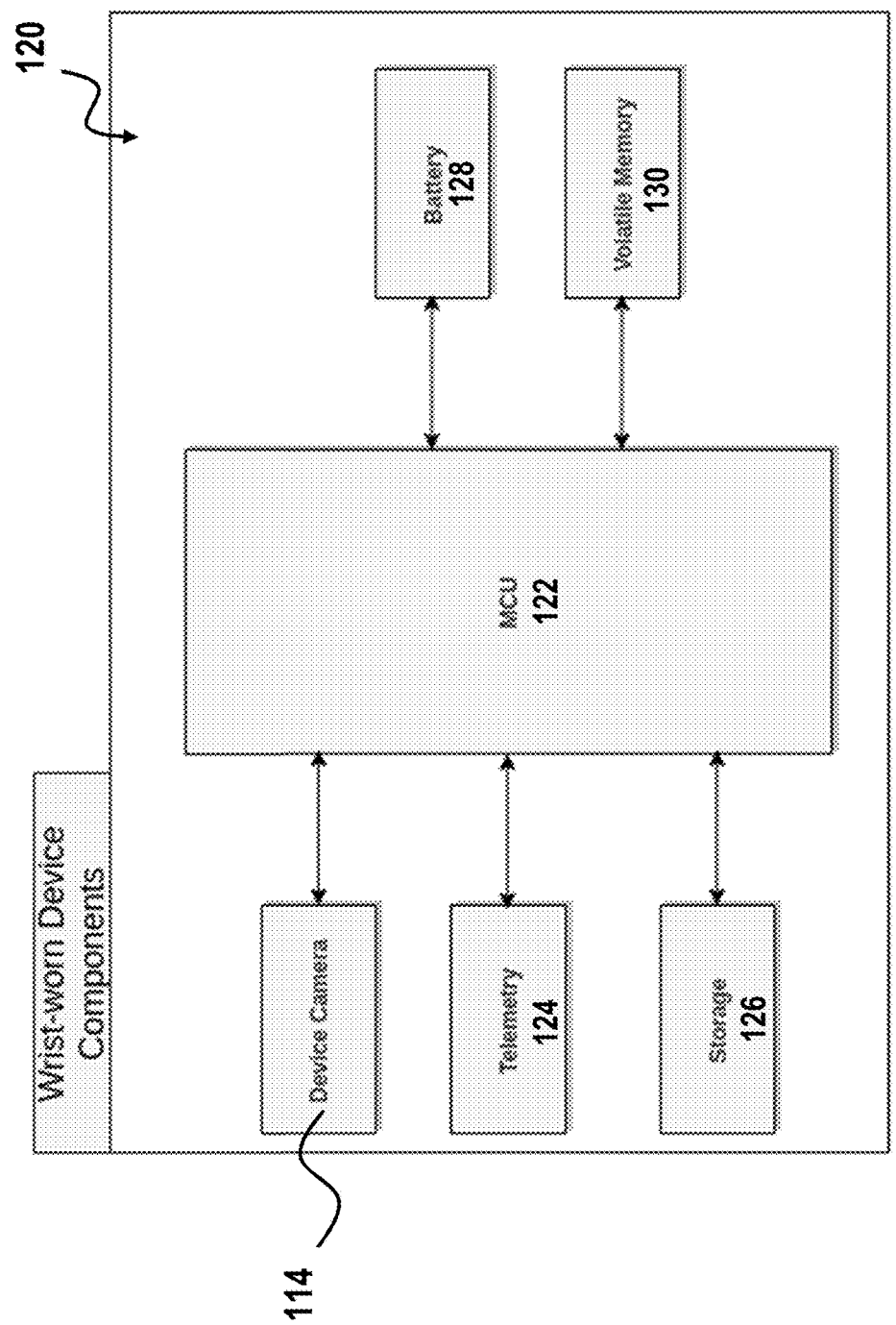
FIG. 2 is a simplified block diagram showing various example components of the wearable device of FIG. 1.

Referring to FIG. 2, the housing 108 can include a plurality of wrist-worn device components, or device components 120. Device components 120 can include a microcontroller unit (MCU) 122 in communication with the camera 114, a telemetry unit 124, a storage unit 126, a battery 128, and volatile memory 130. Returning to FIG. 1, the camera 114 can take the form of a miniature camera device positioned along the housing 108 such that the camera 114 is oriented to capture data from along a ventral side of the wrist 110 via the MCU 122 and the telemetry unit 124. It is believed that the ideal position to place the camera 114 of the wearable device 102 is the ventral side of the wrist 110, as this position affords a comprehensive view of the palm 118 and the fingers 117 which accommodates the video capture for generating activity inferences described herein. The camera 114 can include one or more image sensors such as a CMOS (complementary metal-oxide semiconductor) and/or CCD (charge-coupled device). By example, A CMOS image sensor contains photodiodes corresponding to pixels of a captured image, and the photodiodes can be arranged in rows and columns. To capture an image, successive rows of photodiodes are exposed and read over time. The camera 114 can include any number or type of such image sensors positioned anywhere along the housing 108, the image sensors can be electrically integrated with other components of the housing 108 described herein, and/or mounted as a discrete separate device along the housing 108 to accommodate the below wrist 110 video capture along the fingers 117 as described.

Figure 15:
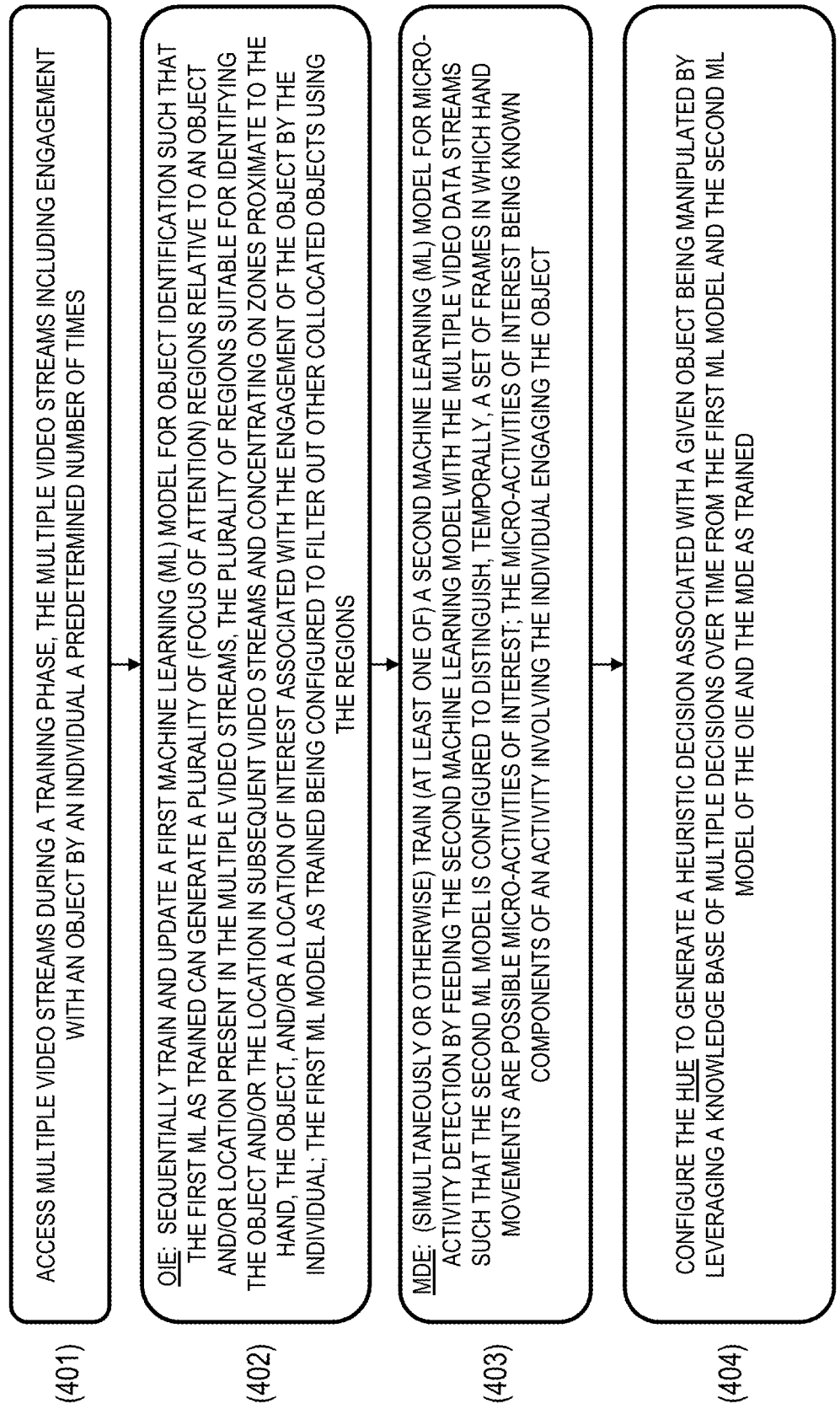
FIG. 15 is a process flow describing possible training and configuration aspects associated with the system described herein.

In addition, the wearable device 102 can be accompanied by a mobile application 190 running (FIG. 10) an executable on a tablet, mobile, or other external computing devices 200 (FIG. 15). Executing the mobile application 190, such external computing devices 200 can prompt an individual to engage an object, identify/confirm an object, and other aspects described herein. In some examples, the wearable device 102 can continuously monitor movements of the palm 118 and fingers 117 during object interactions to infer micro-activities, finally helping to infer the individual's actions.

Referring to FIGS. 3A-3C, and FIG. 4, the system 100 includes an Activity Identification and Monitoring System (AIMS) 140 that analyzes and identifies activity using one or more sub-engines. The AIMS 140 can be deployed onboard the wearable device 102 or onboard an external computing device or processing element (e.g., processor 104) that communicates with the MCU 122 and/or other components of the wearable device 102, or combinations thereof. A first sub-engine of the AIMS 140 is an Object Identification Engine (OIE) 142 configured to filter out objects that are not of interest and identify those potentially of interest. A second sub-engine of the AIMS 140 is a Micro-activity Detection Engine (MDE) 144 that analyzes the stream of video frames to distinguish sets of frames in which movements of the hand 116 are potential micro-activities of interest. Both can be trained simultaneously for a given individual with samples provided by or corresponding to the individual, wherein the individual is asked to perform the activity of interest. A third sub-engine of the AIMS 140 is a Heuristic Understanding Engine (HUE) 146, which is tasked with extracting and identifying known activities of interest and in carrying out this task can be configured to contend with a host of random distractor micro-activities that cannot be defined beforehand. The HUE 146 can leverage a knowledge basis to deduce that the individual has correctly completed an activity, and if not, what went wrong.

In a preliminary phase of implementing the system 100, the wearable device 102 can be first calibrated for the individual 112 by having the individual 112 perform a set of activities. The calibration can include adjusting a field of view of the camera 114, illustrated in FIG. 3A as FOV 132, so that the individual's fingers 117 and palm 118 and an object to be manipulated, such as object 134 in FIG. 3A, are visible somewhere within the field of view at critical points during a given pre-defined activity.

To infer the individual's actions, the AIMS 140 of the present system 100 can be calibrated to each individual by identifying one or more Focus of Attention Regions (FARs), a FAR (illustrated as FARs 136) being a closed and compact region that contains the object of interest and/or the individual's fingers. The purpose of the FAR is to reduce the search region for the object of interest and support efficient and effective algorithms for object identification. The pre-defined activity and the individual's morphological and behavioral idiosyncrasies can determine the focus of attention regions where the fingers and palms and objects are expected to be located. Examples of FARs 136 are shown as Focus of Attention (FAR) 136A and FAR 136B in FIG. 3A, FAR 136C in FIG. 3B, and FAR 136D and FAR 136E in FIG. 3C. In some examples, the FARs 136 can be selected by the individual 112 and can be identified by asking the individual 112 to reach out to a predetermined or known object. It is the movement of the hand 116 toward the object that identifies the given FAR of the FARs 136.

Figure 3A:
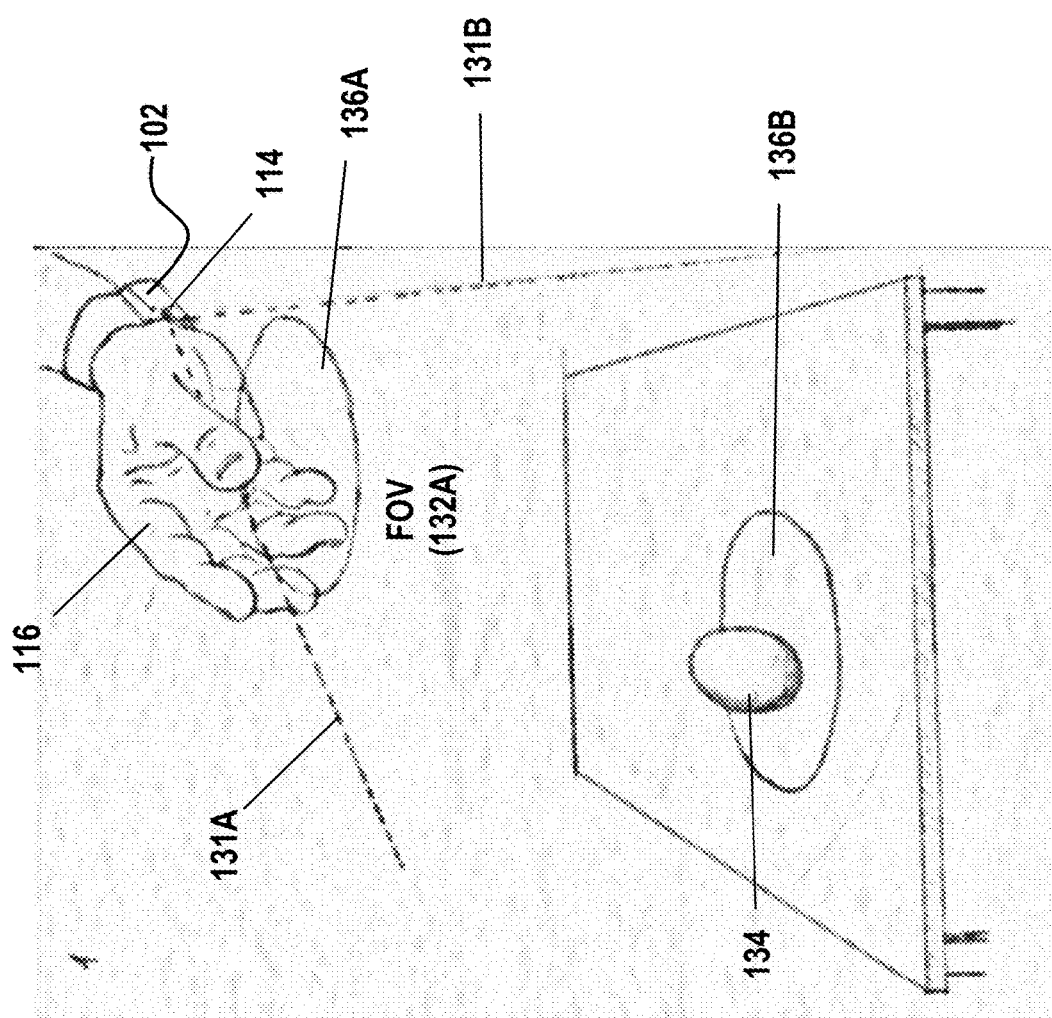
FIG. 3A is an illustration showing two focus of attention regions associated with engagement of an object as determined using the wearable device of FIG. 1; in which a first focus of attention region encompasses three-dimensional (3D) space around the object and a second focus of attention region encompasses a 3D space along the palm and the ends of the fingers.

To illustrate a specific example, FIG. 3A shows the hand 116 in a first configuration for approaching and/or preparing to grasp an object 134 on a table. The camera 114 is positioned to capture data along a field of view 132A along the wrist 110 directed towards the fingers 117 (defined between axis 131A and axis 131B) that encompasses two focus of attention regions (FARs) (FAR 136A and FAR 136B) that can be superimposed. In particular the FAR 136A defines a zone in which a portion of the palm 118 and the ends of the fingers 117 are visible; and FAR 136B defines a zone around the object 134 as shown.

Figure 3B:
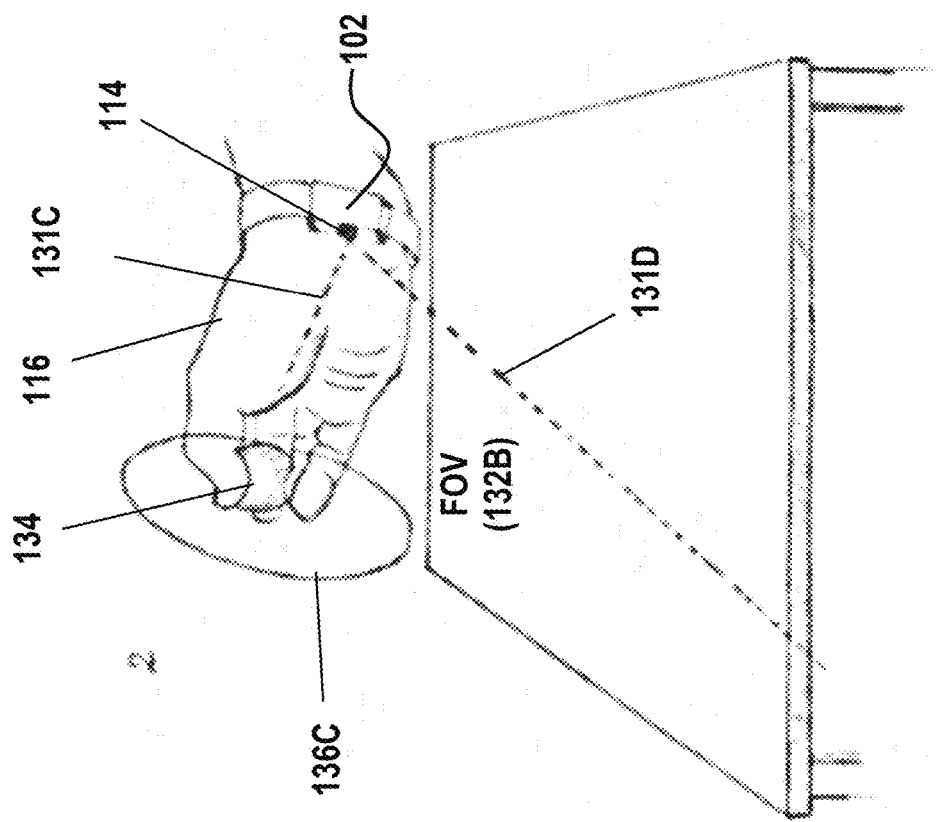
FIG. 3B is an illustration showing a focus of attention region encompassing 3D space when grasping an object as determined using the wearable device of FIG. 1 in which portions of the palm, the fingertips, and the object are visible.

In a second configuration of the hand 116, one would expect to see the fingers 117 closing up as the hand 116 approaches closer to the object 134. FIG. 3B shows the hand 116 holding the object 134 such that the camera 114 captures data along a field of view (FOV) 132B (defined between axis 131C and axis 131D). The FOV 132B includes a focus of attention region 136C superimposed in which portions of the palm, the fingertips, and the object are visible.

Figure 3C:
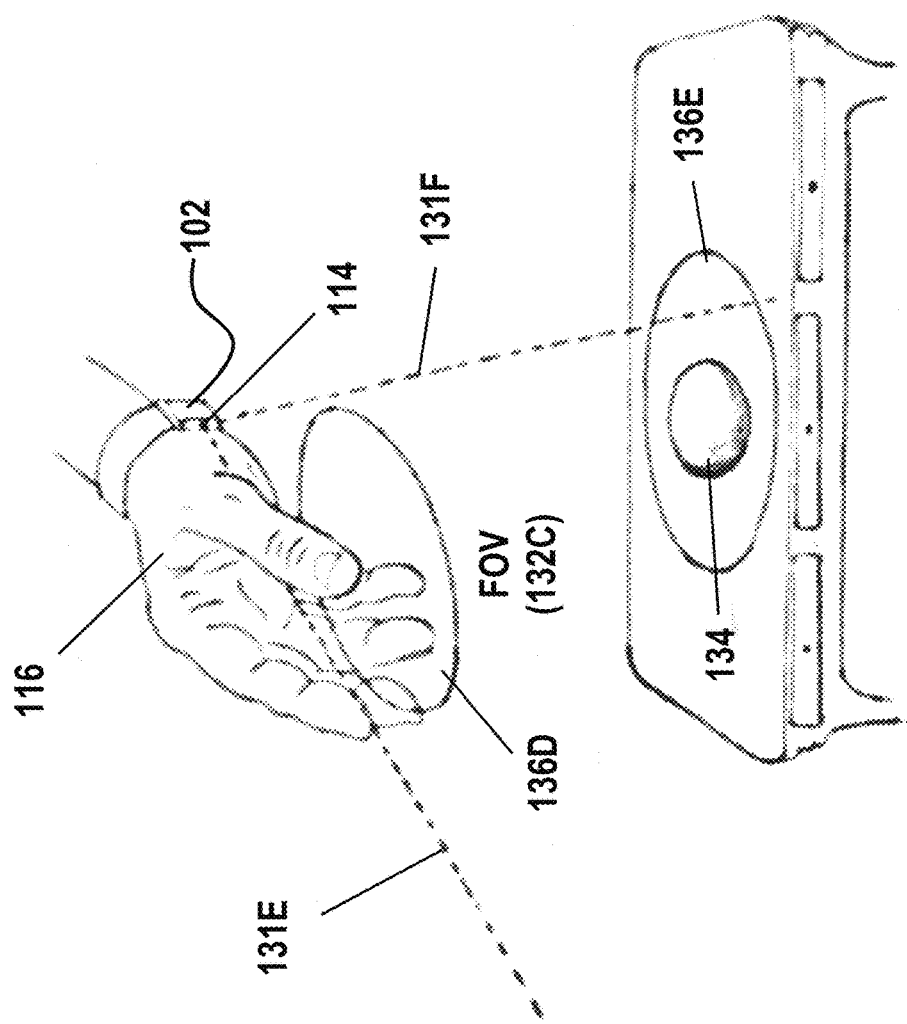
FIG. 3C is an illustration showing two focus of attention regions when releasing an object using the wearable device of FIG. 1 highlighting 3D space around the object and 3D space encompassing a portion of the palm and the ends of the fingers.
Figure 4:
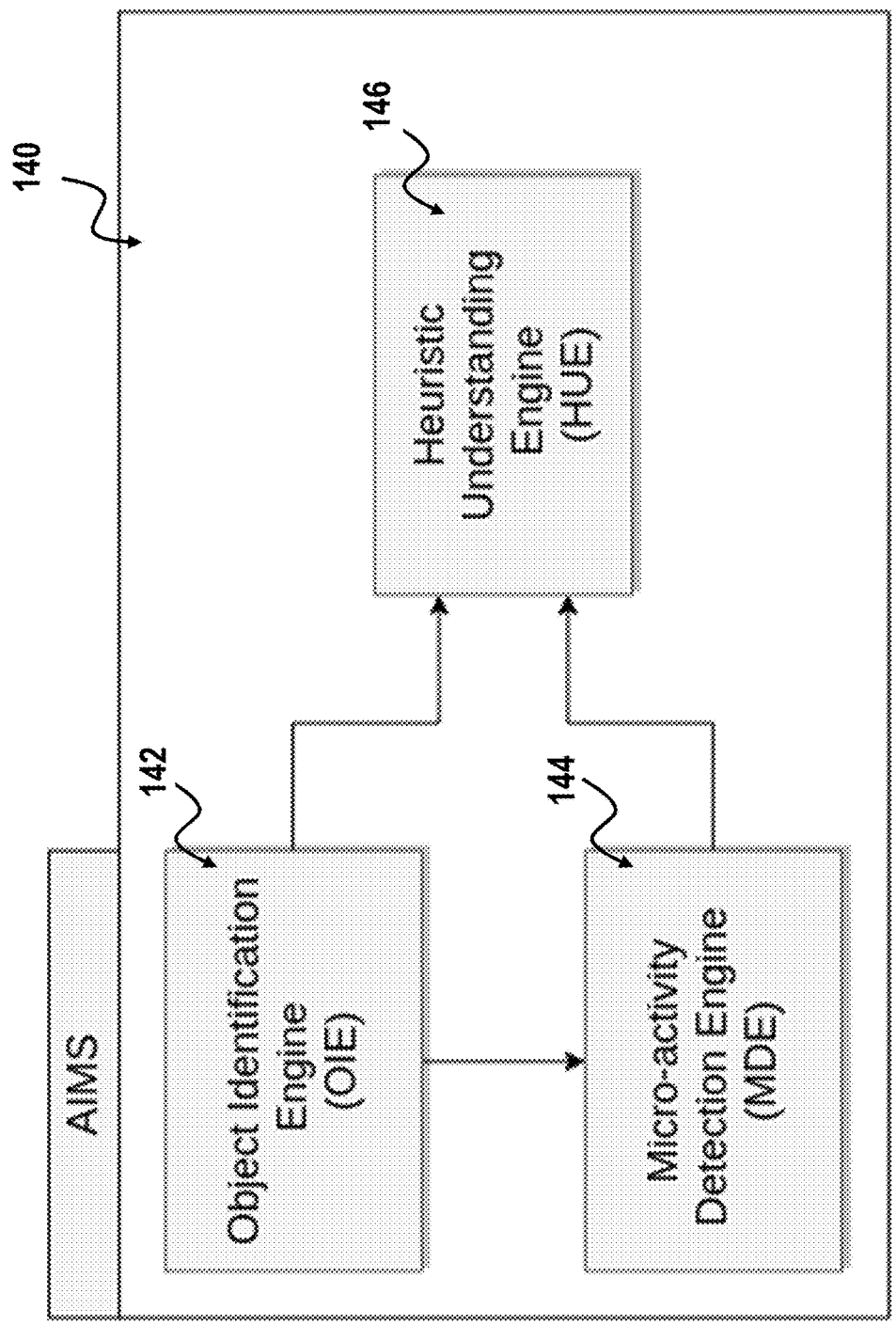
FIG. 4 is a simplified block diagram showing example components of an Activity Identification and Monitoring System (AIMS) of the wearable device of FIG. 1 that is configured to infer an activity.

FIG. 3C shows the hand 116 in a third configuration just having released the object 134 with the camera 114 capturing data along a field of view 132C (defined between axis 131E and axis 131F) including two focus of attention regions (136D and 136E) superimposed. The FAR 136D includes a zone in which a portion of the palm 118 and the ends of the fingers 117 are visible. The FAR 136E indicates a zone around the object 134 where one would expect to see the fingers 117 opening up as the hand 116 recedes from the object 134.

Example Processes

The AIMS 140 (FIG. 4) is generally configured for providing effective predictions of activities captured by the camera 114 of the wearable device 102. The system 100 can implement various possible processes for hand activity identification using the AIMS 140 and/or other components described herein. The Object Identification Engine 142, Micro-activity-detection Engine (MDE) 144, and Heuristic Understanding Engine (HUE) 146 can collectively be configured for activity understanding. In one example, AIMS 140 is part of mobile application running on an external computing device (e.g., 200 of FIG. 15) such as a tablet or a mobile device in operable communication with the wearable device 102. In other embodiments, it can run on smartwatches or other mobile devices.

Object Identification Engine

A general objective or purpose of the Object Identification Engine (OIE) 142 (FIG. 4) is to track pre-specified objects or objects associated with a given location. The OIE 142 analyzes the individual frames from a video stream generated by the camera 114 as the camera captures data to identify objects and locations of interest. The OIE 142 can be customized to the individual 112 during a training phase. For example, the OIE 142 can include a neural network or other such machine learning model that can be trained to be personalized to the individual 112 and therefore built to identify the individual's objects of interest. As personalized, the neural network as built can be extended/augmented via a readily available pre-trained object identification network.

Figure 5:
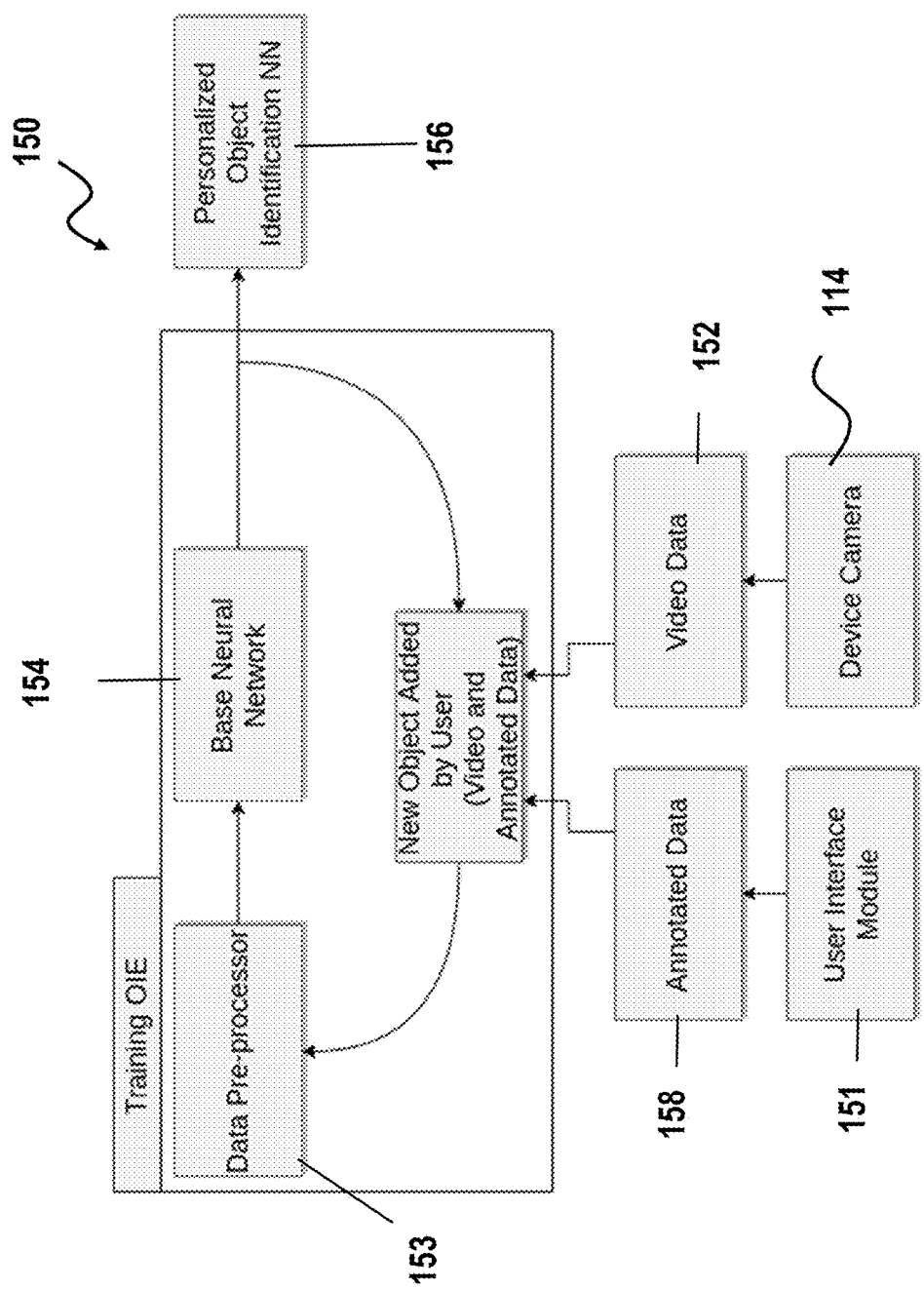
FIG. 5 is a simplified block diagram showing training of an Object Identification Engine (OIE) of the AIMS of FIG. 4.

FIG. 5 illustrates an example process 150 for training the OIE 142 or aspects thereof for each object of interest. A similar training process is described in FIG. 15, and includes the following example aspects.

Step 1: Conduct video capture by the camera 114 of the individual 112 engaging an object x number of times with a different trajectory. During these movements, video data 152 including at least one data stream from the camera 114 is acquired and stored in memory (e.g., the Video Data Store of FIG. 11). In some examples, via a user interface (UI) module 151 or otherwise, for each object of interest, the individual 112 can be prompted to reach toward the object, pick up the object from a surface, and release the object back down upon the surface.

Step 2: One or more focus of attention regions (FARs), or simply, regions, can be generated and mapped to the video data 152 to (create annotated data 158 and) track the object across image frames of the video data 152. For example, an initial FAR can be generated from the object being identified in a single frame of the data stream.

Figure 11:
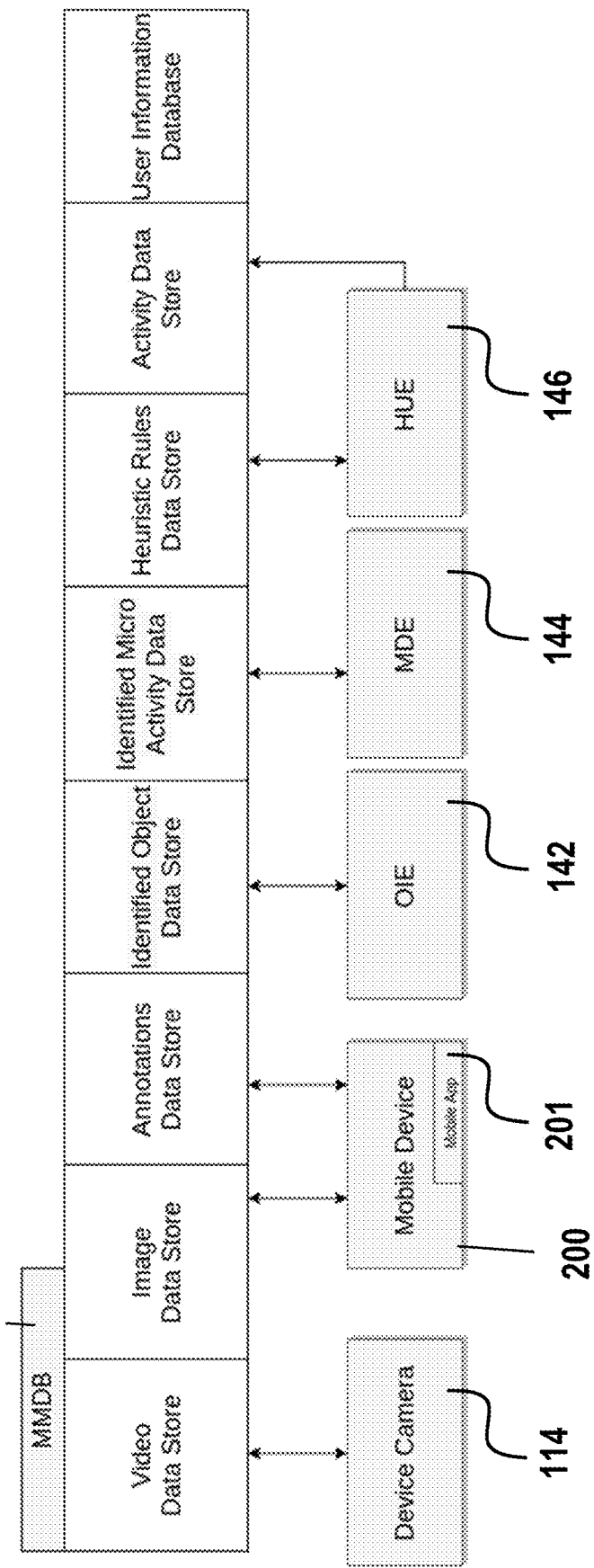
FIG. 11 is a simplified block diagram showing a Multimodal Database and exemplary datastores associated with the mobile application of FIG. 10.

In some examples, the individual 112 can be prompted to confirm a presence of the object itself and/or location of the object in a single image frame from the data stream of the video data 152. This information can then be used to generate and/or annotate the image frame with a FAR that focuses on the object and/or the hand in that frame. In addition, using any suitable techniques, the position of the object can be tracked across following frames and these positions can be tracked with other FARs and stored in the Annotations Data Store (FIG. 11).

Step 3: A base machine learning model (e.g., base neural network) 154 can be trained to generate a (trained) personalized object identification network (156) using the video data 152 mapped with the FARs as described. Techniques of few-shot learning can be applied to efficiently train the personalized object identification network 156 with a minimal number of examples to identify the object in future frames by focusing on image features within FARs predetermined to typically reveal the same object. Further, techniques of incremental learning can be utilized to update the personalized object identification network 156 with the ability to identify new objects while not forgetting old objects.

In some examples, as indicated in blocks 401-402 of FIG. 15, training of the OIE 142 can include accessing multiple video streams (collectively the video data 152), the multiple video streams including engagement with an object by an individual a predetermined number of times; and sequentially training and updating a first machine learning (ML) model such as a neural network by generating a plurality of (focus of attention) regions relative to an object and/or location present in the multiple video streams. The regions are suitable for identifying the object and/or the location in subsequent video streams and facilitate concentration on zones proximate to the hand, the object, and/or a location of interest associated with the engagement of the object by the individual. In addition, the first ML model as trained can be configured to filter out other collocated objects using the regions.

In some examples, the base neural network 154 can play the role of a feature extractor. It can take in an image as input and output a vectorized representation of the image called a feature vector. When a new object is added to the network, only the network that is added to the base network; the personalized network will be trained. The personalized object identification network 156 is smaller in size and less complex; this increases the speed of the training of the network and reduces the requirement of large samples of images. The OIE 142 incrementally augments the capabilities of the personalized object identification network 156 to recognize a new object.

Figure 6:
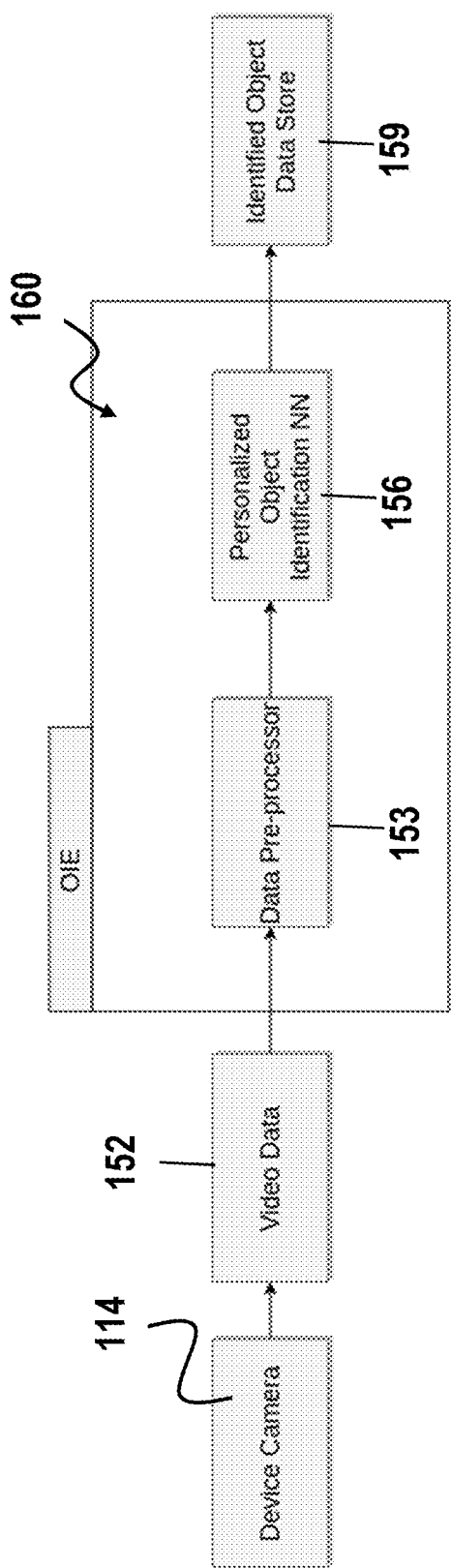
FIG. 6 is a simplified block diagram showing an example implementation of object identification using the OIE of FIG. 5.

FIG. 6 is a flowchart 160 illustrating example implementation or use of the OIE 142. As indicated:

Step 1: A data pre-processor (153) can predict the most likely location of an object and creates a FAR for each individual frame of video data captured.

Step 2: The personalized object identification network 156 takes the FARs and proceeds to provide a prediction of what the object is.

Micro-Activity Detection Engine

One role of the MDE 144 is to deduce the micro-activities performed by the individual 112. Deep neural networks over a set of temporally-linked frames can be trained to identify micro-activities at the right grain size of a gesture. A micro-activity includes the movement of the wrist 110 and the fingers 117 of the hand 116. The action performed by each individual is different, and the MDE 144 is configured to personalize the actions performed to the particular individual by leveraging a training process that can create a tailored neural network or other machine learning model for the micro-activities being performed. The micro-activities detected can help aid in inferring the state of the activity being detected. The micro-activities that are not being tracked can be classified as distractors and can be disregarded from or otherwise not affect the AIMS 140. The training process for the MDE 144 can be iterative and can learn with time as more actions are performed.

Figure 7:
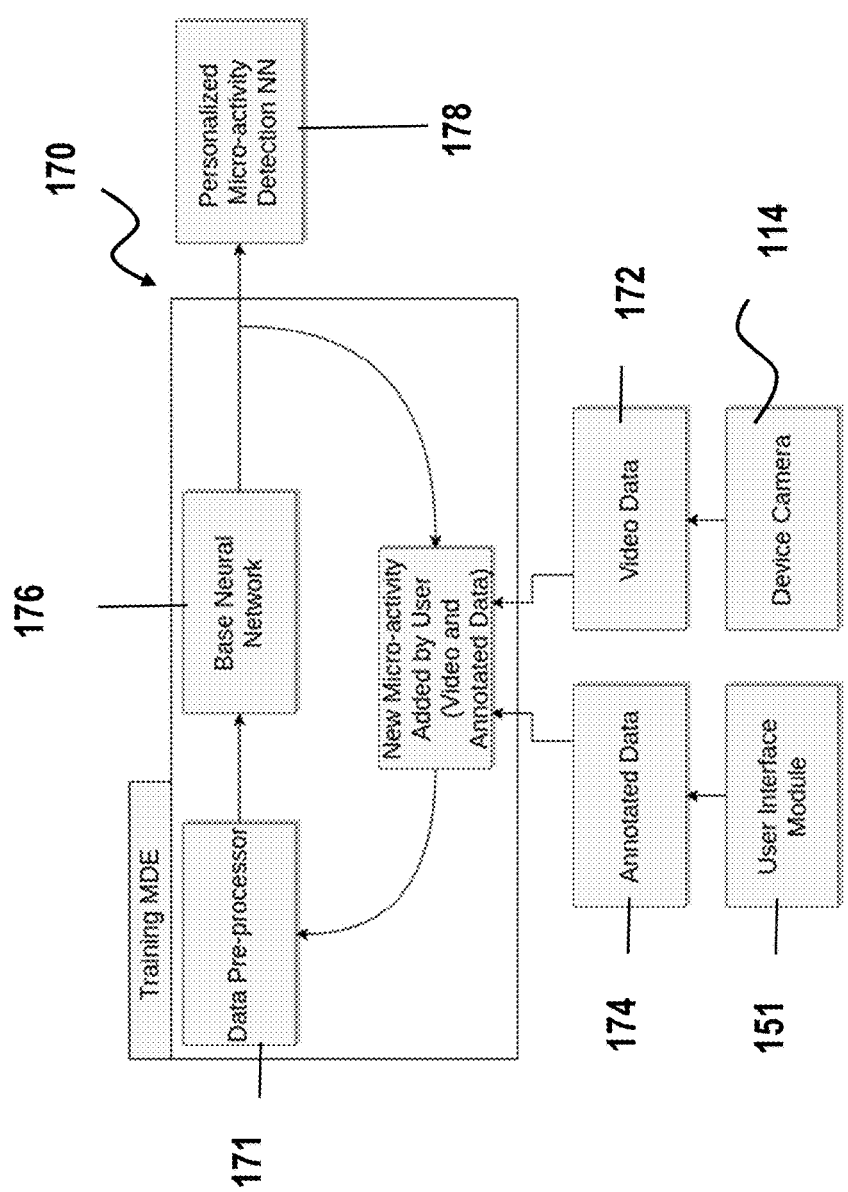
FIG. 7 is a simplified block diagram showing training of a Micro-activity Detection Engine (MDE) of the AIMS of FIG. 4.

Training of the MDE 144 is illustrated by the example process 170 in FIG. 7 and FIG. 15, and can include the following aspects (and, in some example training implementations, be conducted simultaneously with the training of the OIE 142).

Step 1: For each object of interest, the individual 112 can be prompted to engage a given object and to reach, grasp, displace, and release the given object a predetermined number, or X number of times. In this example, a "reach," "grasp," and "displace" all include micro-activities indicative of associated with an overall activity to engage the object (e.g., picking up a pill box as an object of interest, retrieving a pill from the pill box for consumption, and releasing the pillbox). During this step, the camera 114 captures video data 172 (comprising one or more image frames) and generates a video stream such that repetition of the subject video capture (X number of times) generates multiple video streams for training. Video data 172 can include or define training or testing data and can be fed to a first machine learning model (e.g., a neural network such as base neural network 176), to train the first machine learning model to detect one or more micro-activities associated with a given activity of the individual.

Step 2: Each of the micro-activities performed, in this example, a "reach," "grasp," and "displace," can all be mapped to training data (e.g., video data 172) to train one or more of a second machine learning (ML) model for micro-activity detection by feeding the second machine learning model with the video data 172 such that the second ML model is configured to distinguish, temporally, a set of frames in which hand movements are possible related to or reflecting one or more micro-activities of interest. Again, the micro-activities of interest are known sub-components of an overall activity involving the individual engaging the object, and feeding the second machine learning model trains the model to distinguish these movements from other movements present in the data.

In some non-limiting examples, the individual 112 can be prompted to annotate a video stream of the video data 172 with regards to the reaching, grasping, displacing, and releasing micro activities phase via the UI 151 or otherwise. This results in generation of annotated data 174; i.e., data with micro-activities (reaching, grasping, displacing, and releasing) associated with the engagement of the object annotated in the video stream.

Step 3: The temporally-linked frames from the video stream of the video data 172 can be used to create a personalized Micro-activity Neural Network 178 (by training a base neural network 176). In other words, training of the MDE 144 can leverage temporally-linked data frames and training of a neural network specific to the interaction with the object.

In some examples, training of the MDE 144 (and/or the OIE 142) incorporates a sliding-window approach where regions 136 define a width and height that moves over an image across multiple image frames over time of the video data 172. In these examples components located or present inside the regions 136 (and/or the regions itself) can be classified using any classification approach to identify whether the object of interest is present in one or more of the image frames. Where the object is identified, the pose of the hand, wrist, fingers, and position of the object relative to the regions 136 correlates to predetermined micro-activities. Combining sliding windows with object classification can accommodate the training of a classifier for image detection as well as the identification of sizes and positions of objects passing through the regions 136 over time (temporally across image frames of the video data 172).

Figure 8:
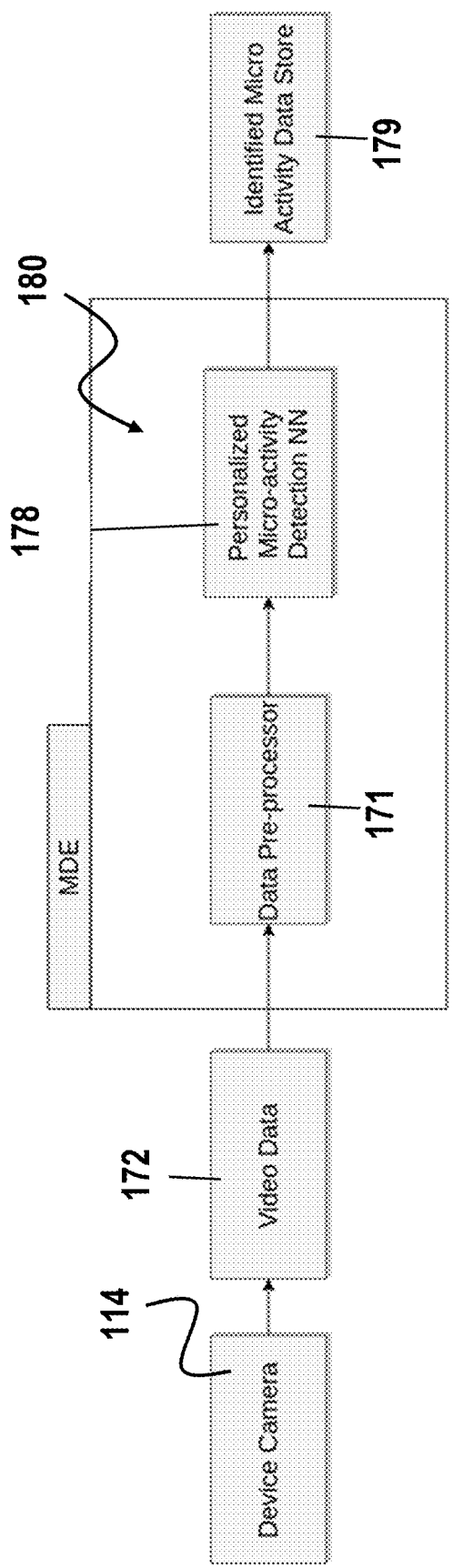
FIG. 8 is a simplified block diagram showing an example implementation of the MDE of FIG. 7.

FIG. 8 is a flowchart 180 illustrating example implementation or use of the MDE 144.

Step 1: The data pre-processor uses the predictions from the OIE 142 to decompose the video stream into distinct micro-activities.

Step 2: The personalized Micro-activity Neural Network 178 takes the micro-activities and then attempts to identify them.

Heuristic Understanding Engine

Figure 9:
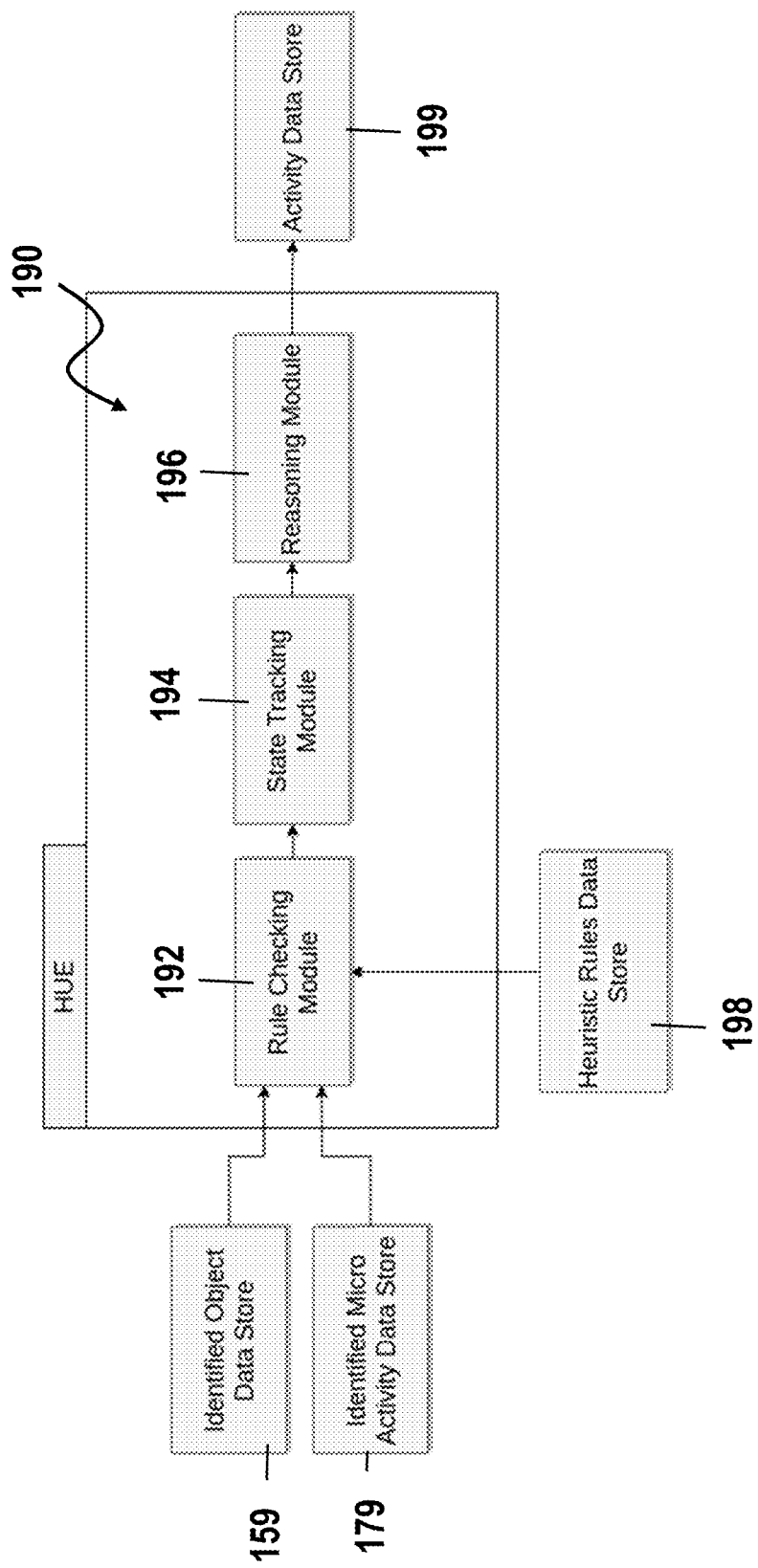
FIG. 9 is a simplified block diagram showing example aspects of a Heuristic Understanding Engine (HUE) that can be included with the AIMS of FIG. 4.

The HUE 146 as further detailed in the flowchart 190 of FIG. 9 can use multiple decisions over time from the OIE 142 and MDE 144 to make a heuristic decision on the object that is being manipulated by the hand 116 of the individual 112. This ensures the problem of occlusion with hand or other objects is resolved and also ensures the correct object is identified in a setting where multiple objects are in the view of the camera 114. As indicated in FIG. 9, the HUE 146 can include Identified Object Data Store 159 from FIG. 6, the Identified Micro Activity Data Store 179 from FIG. 8, a rule checking module 192, a state tracking module 194, a reasoning module 196, a heuristics rules data store 198, and an activity data store 199.

The HUE 146 can also keep track of the objects of interest and micro-activities that can be performed with those objects as state machines. It uses the state machine to determine the success of the activity performed based on the objects, environment, and the micro-activities detected. In the state machine, each node is a state of activity performed, and the transitions are based on the micro-activities performed. Given the particular state and the micro-activities detected, the system moves to a new state or returns to the original state.

The state machines are personalized to different activities, and the states can be guided by different heuristic rules. The HUE 146 can use a state machine (state tracking module 194) to keep track of the objects detected, their status, and the interactions with the objects. This can help with determining the activity that is being performed (which can be identified in Activity Data Store 199). The HUE 146 can also use a rule-based model (rule checking module 192) to identify different situations such as periods of no activity, interaction with distractors. The reasoning module 196 provides the reasoning behind successful and unsuccessful activities with the help of Heuristic Rules (stored in Heuristic Rules Data Store 198).

In cases of occlusion or partial views of an object, the fingers 117 may not completely enclose the object. In these situations, the position of the object can be inferred from the position of the fingers 117. This information is enough to reduce the search space as the OIE 142 tries to identify the object. The finger pose carries additional clues to the size of the object, which can also be used to identify the object. The focal length of the camera 114 can be used to identify the size of the real-world object based on the number of pixels it occupies in an image. Consider the use case of trying to identify 'keys' versus a 'water bottle'. The hand poses when handling these objects are distinct. When the object is in hand, the keys will usually fit completely into the image frame, whereas the water bottle may be partially visible. Since the camera 114 captures a video stream, the HUE 146 can step back in time to search for the water-bottle in earlier frames from the data provided by the OIE 142 (Identified Object Data Store 159) when the hand was still some distance away from the water bottle. In these images, there is a chance the water bottle is completely visible as the camera is imaging it from a distance. All of these additional clues can be leveraged to identify the object of interaction precisely.

In some examples, the wearable device 102 equipped with Near-Field Communication (NFC) or Bluetooth beacons to save battery. Activation of these beacons affects the states or triggers an activity.

Mobile Application

Figure 10:
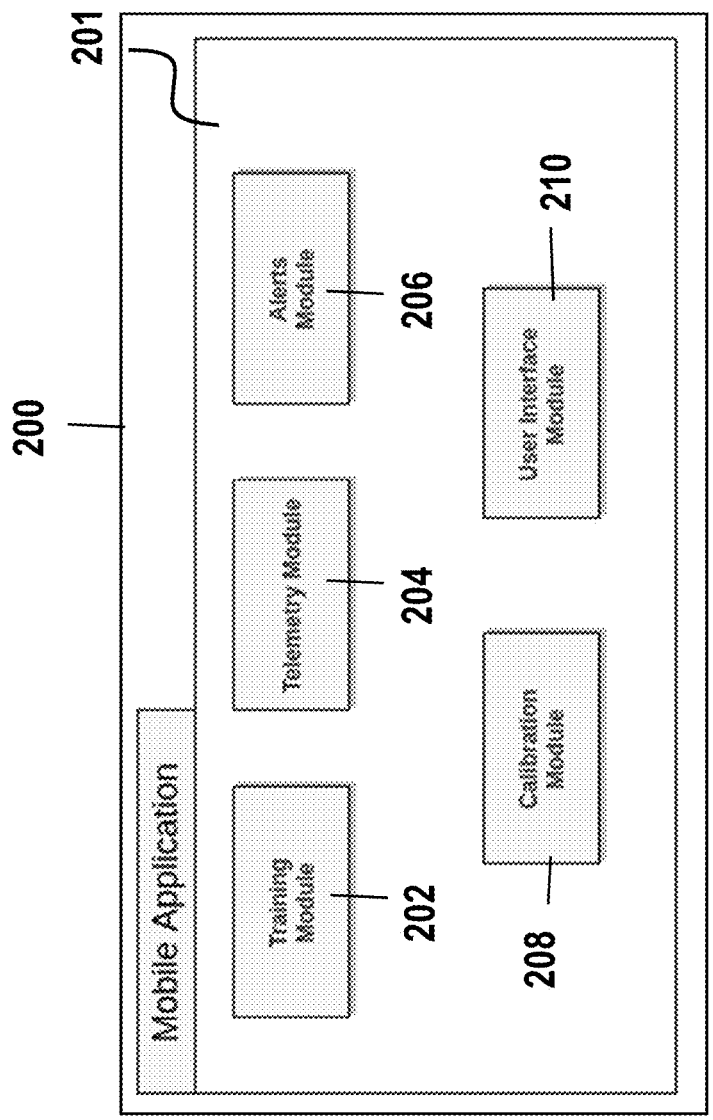
FIG. 10 is a simplified block diagram showing various example components of a mobile application that can be included by the system of FIG. 1 that interfaces or otherwise incudes the AIMS of FIG. 4 for use with the wearable device of FIG. 1 to infer an activity and engage with an individual.
Figure 12:
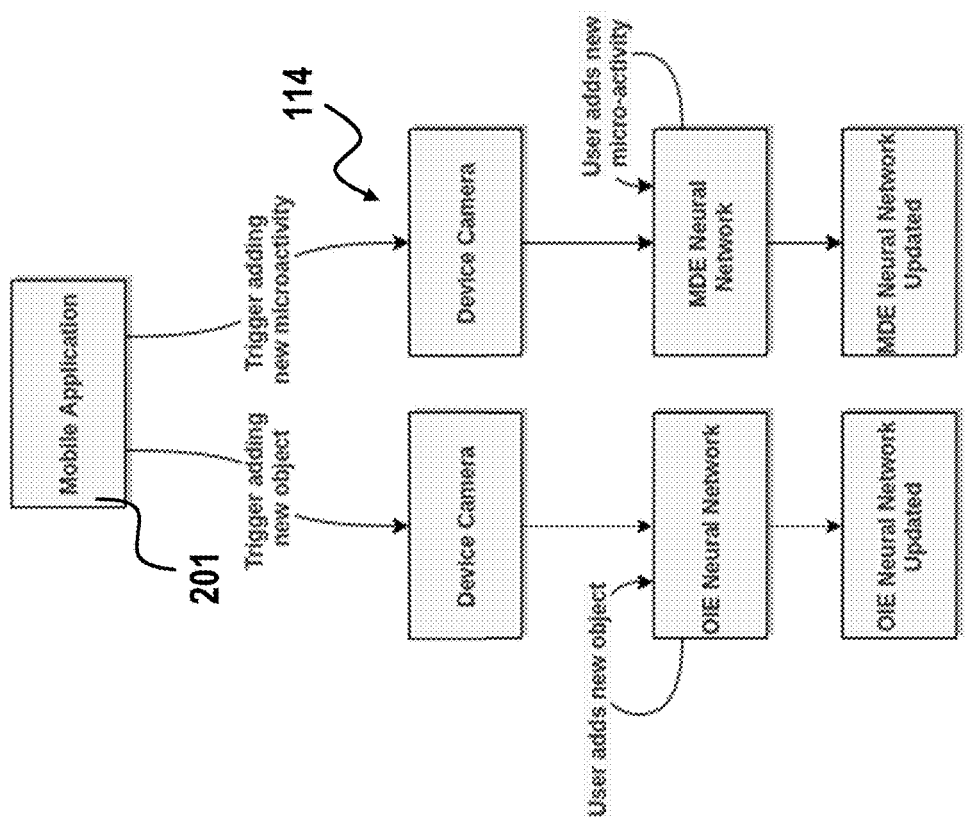
FIG. 12 is a simplified flowchart showing example general training processes for the OIE and the MDE of the AIMS of FIG. 4.
Figure 13:
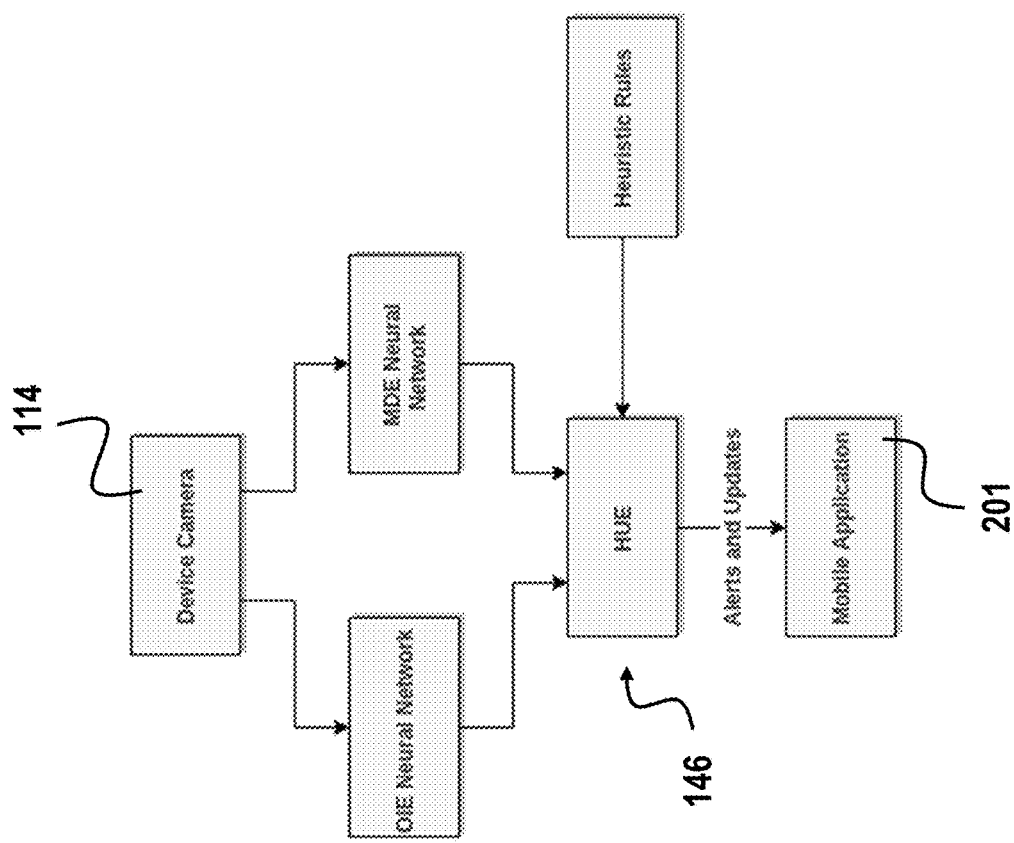
FIG. 13 is a simplified flowchart showing general implementation example processes for the AIMS of FIG. 4.

Referring to FIGS. 10, 12, and 13, in some examples, the system 100 can include an external device 200, or a device separate from the wearable device 102 in operable communication with the wearable device 102 and/or any processing element having access to the data acquired by the wearable device 102. The external device 200 can be configured for executing a mobile application 201 (FIG. 10) which may include a training module 202, a telemetry module 204, an alerts module 206, a calibration module 208, and a user interface module 210. Other such components are contemplated.

In general, implementing the mobile application 201, the external device 200 provides a visual display that allows individuals to track activities, get updates, add or remove objects of interest. The Calibration Module 208 allows the individual to calibrate the device by locating the FARs. The training module 202 provides the interface for the individual to add new objects and micro-activities. The Telemetry Module 204 is responsible for the communication between the wearable device 102 and the external device 200 running the mobile application 201. The Alerts Module 206 handles the alerts when the individual deviates from the activity. This mobile application 201 can also create and maintain the User Information Database (FIG. 11) that contains information on objects and other personalized data handled by the User Interface Module 210. The mobile application 201 also stores various data required for the training and execution of different processes discussed in a Multimodal Database (FIG. 11). The mobile application 201 is not limited to smartphone applications; it can also be run on smartwatches or other mobile devices.

In one example, the AIMS 140 is used to monitor pill taking. Consider the use-case where an individual wants to leverage the AIMS 140 to monitor their medication and pill-taking activity.

First, the system 100 is calibrated by generating video data while an individual is reaching out for a known object while wearing the wearable device 102 and identifying the FARs from the video data generated. As seen in FIG. 12, the individual trains the AIMS 140 to identify objects of interest by providing a video stream of the pill he takes captured by the camera 114 and labeling the objects of interest using the Training Module 202 of the Mobile Application 201 with the wearable device 102 as calibrated. The individual repeats the steps for other pills. The OIE 142 can generate a trained neural network for recognizing the individual pills. In a similar way, as shown in FIG. 12, the individual will also train the system 100 by performing the activity under the supervision of the mobile application 201. This will train the neural network for identifying micro-activities and tune it to the individual. FIG. 13 shows the flow among the different processes in the AIMS 140 during human activity monitoring.

Figure 14:
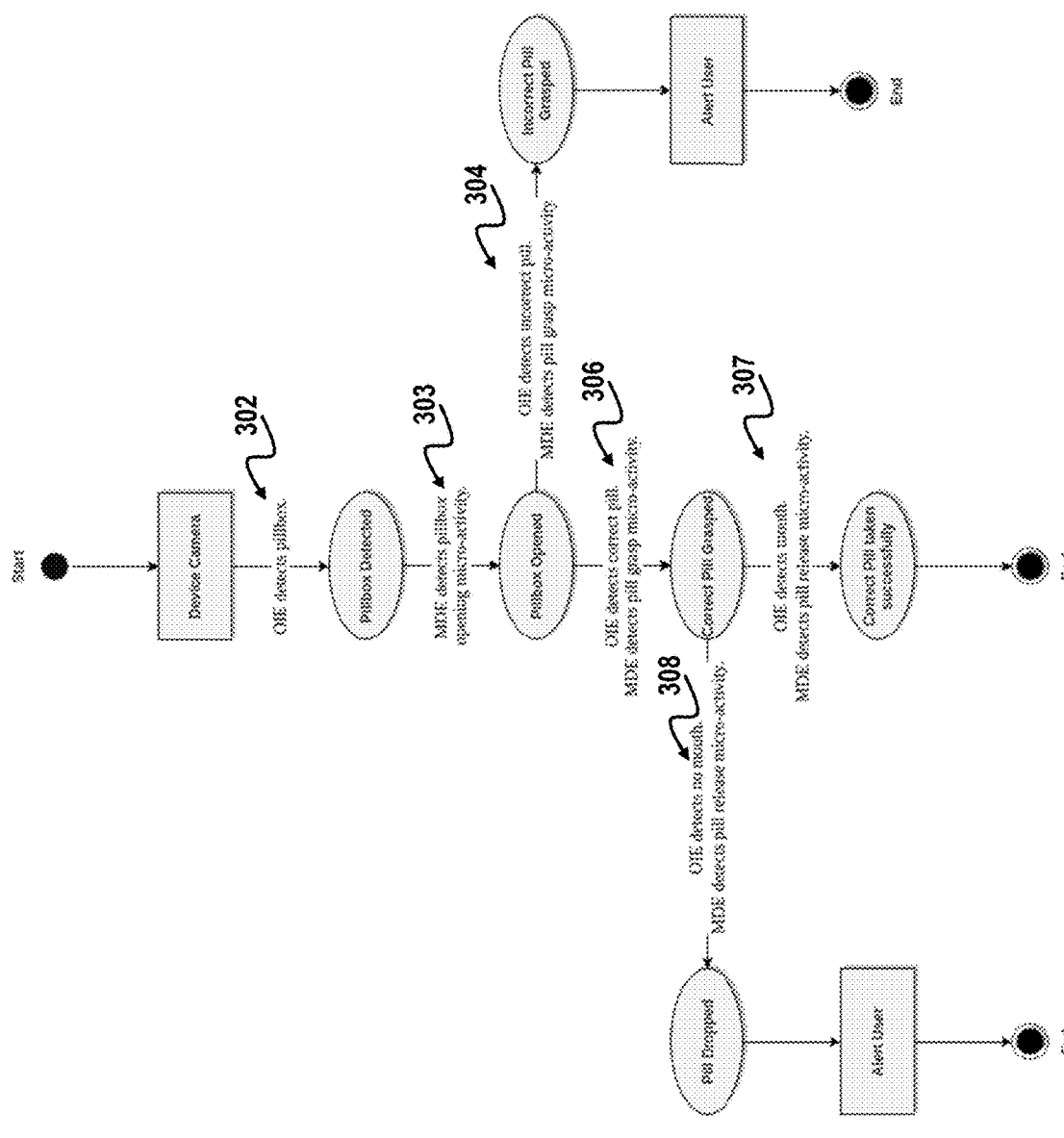
FIG. 14 is an example logic flowchart illustrating a state diagram implementation for a pill-taking scenario as monitored by the AIMS of FIG. 4 using the wearable device of FIG. 1.

As seen in a process flow 300 of FIG. 14, at block 302 the OIE 142 tracks and identifies the pillbox engagement by an individual 112 by analysis of the video data generated by the camera 114. Concurrently, the movement of the hand 116 of the individual 112 is tracked towards the pillbox; at this stage, the pill-taking activity has started and the state machine for pill-taking is at the Pillbox Detected state (block 303). When the individual 112 tries to grab the pillbox and successfully opens it by either twisting or lifting the pillbox as detected by the MDE 144, then a current new state would be Pillbox Opened. This is identified by the MDE 144. Then, the MDE 144 identifies the micro-activities of reaching and grasping the pill and the OIE 142 then verifies which pill is being grasped by the individual's hand 116. Block 306 shows the path for a correct pill, and block 304 shows the path for an incorrect pill. The HUE 146 keeps track of these and moves to the Correct Pill Grasped state when the correct pill is grasped at block 306. Finally, when the OIE 142 detects the mouth and MDE 144 detects the release of the pill into the mouth at block 307, the final state where the individual 112 has successfully placed the correct pill inside the mouth is reached, then the AIMS 140 indicates successful completion of the pill-taking along with reasoning and information such as pill type, pill quantity, etc.

In the case where a pill is picked up but then dropped on the floor, as soon as the pill is dropped, the HUE 146 determines from the OIE 142 and MDE 144 that the pill didn't reach the mouth, and the "pill is released" micro-activity is detected at block 308. The HUE 146 then will classify this as an unsuccessful pill-taking action. Furthermore, the HUE 146 alerts when it identifies serious deviations, such as incorrect pills taken by the individual.

In the case where the individual is distracted and switches to another task and interacts with objects of non-interest, these object interactions are identified as distractors, and the final state of HUE 146 is not reached, thus classifying this as an unsuccessful pill-taking action at block 304. Microactivities such as reaching for a pen (pen being not part of the OIE 142 objects) during the activity of pill-taking would be classified as distractors.

Figure 16:
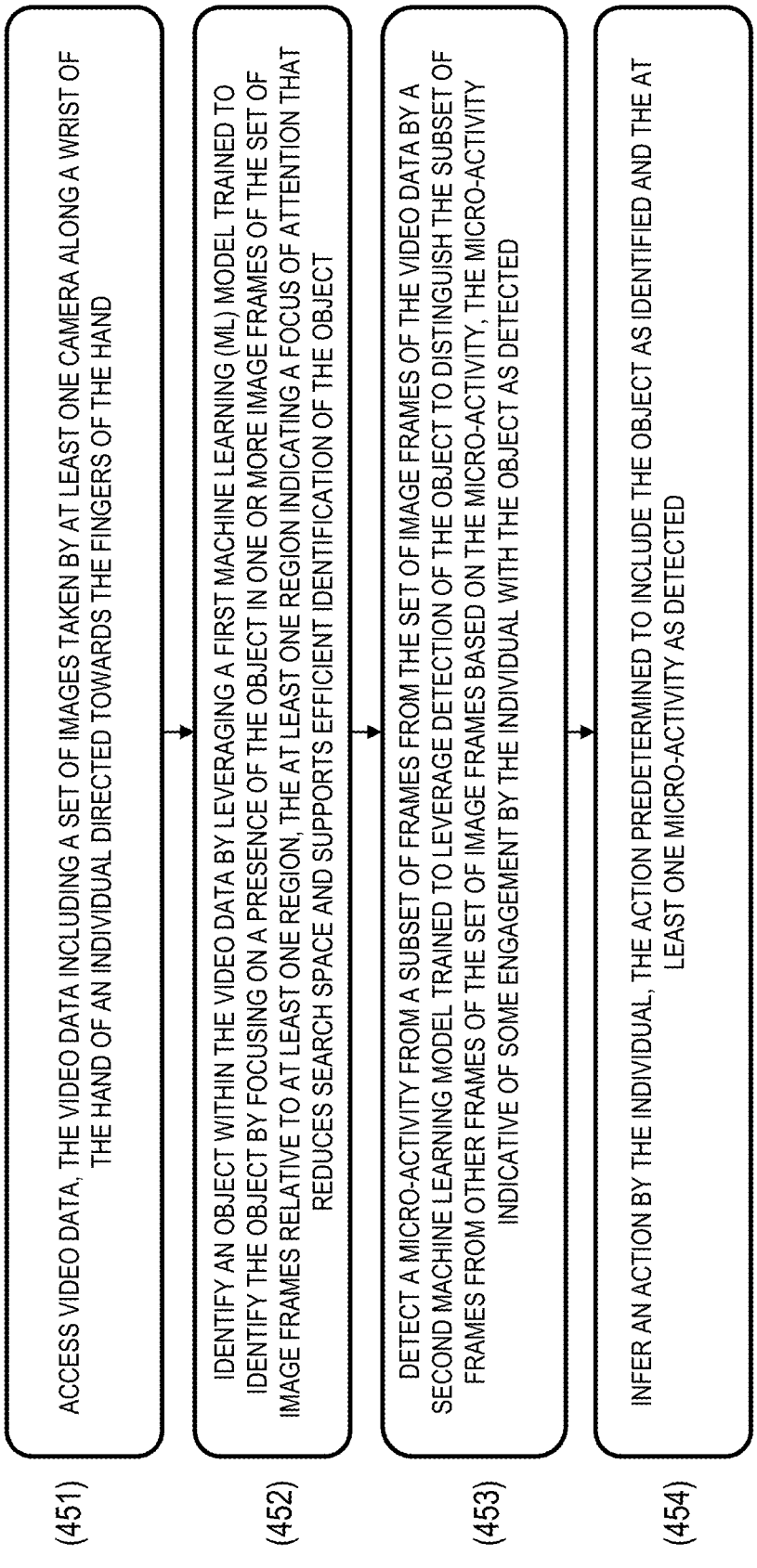
FIG. 16 is a process flow describing possible aspects associated with implementation of the system described herein.
Figure 17:
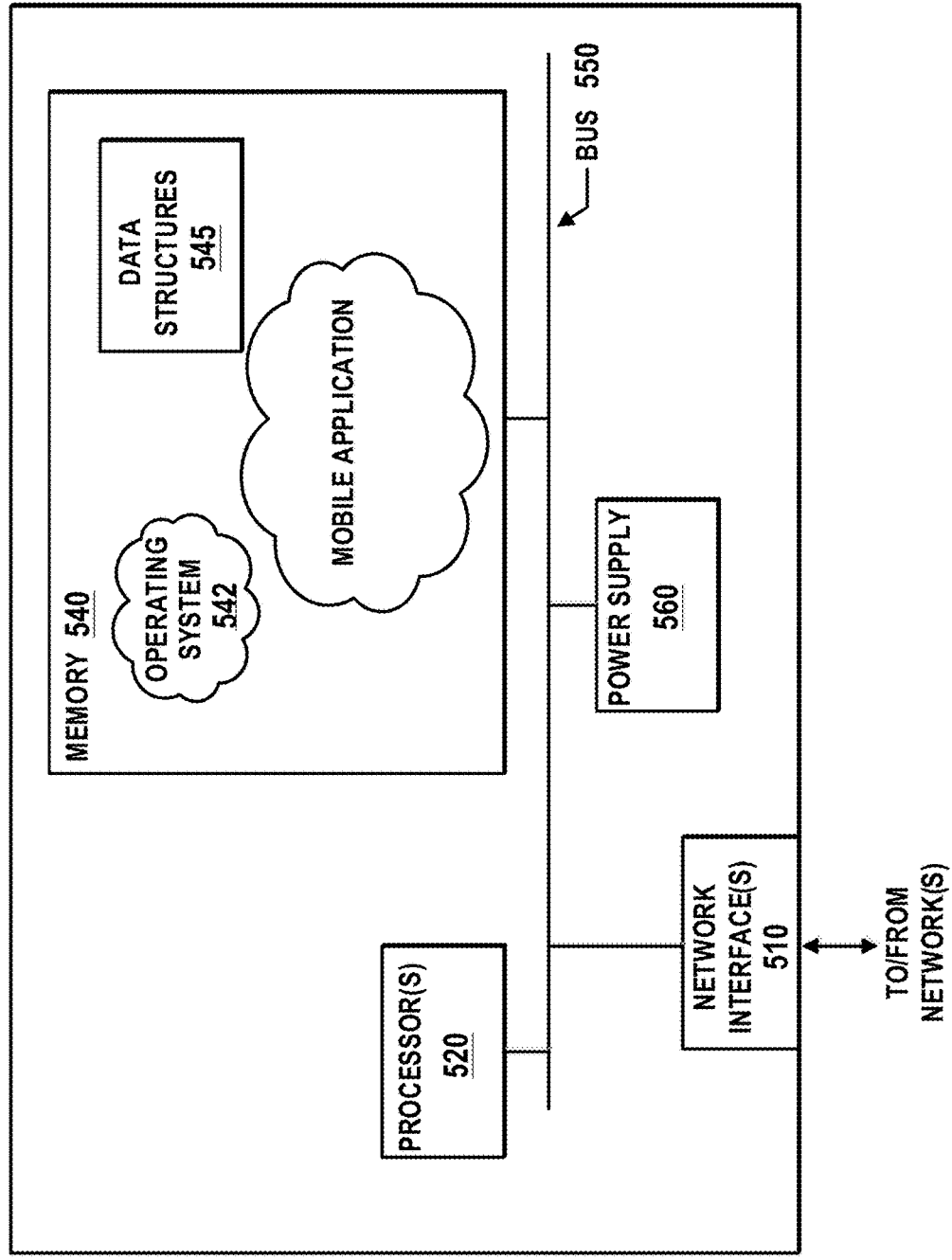
FIG. 17 is a simplified block diagram showing an exemplary computing device and/or system that can be implemented in some examples of the system of FIG. 1.

As described herein, FIGS. 15-16 illustrate additional aspects of example processes that may be performed by the MCU 122, a processing element, and/or combinations thereof. The process 400 of FIG. 15 includes training and configuration aspects as shown in blocks 401-404. FIG. 16. The process 450 of FIG. 16 includes implementation aspects as shown in blocks 451-454.

Computer-Implemented System

FIG. 15 is a schematic block diagram of an example (computing) device 500 that may be used with one or more embodiments described herein, e.g., as a component of wearable device 102 or as external device 200, as the processor 104, etc.

Device 500 comprises one or more network interfaces 510 (e.g., wired, wireless, PLC, etc.), at least one processor 520, and a memory 540 interconnected by a system bus 550, as well as a power supply 560 (e.g., battery, plug-in, etc.).

Network interface(s) 510 include the mechanical, electrical, and signaling circuitry for communicating data over the communication links coupled to a communication network. Network interfaces 510 are configured to transmit and/or receive data using a variety of different communication protocols. As illustrated, the box representing network interfaces 510 is shown for simplicity, and it is appreciated that such interfaces may represent different types of network connections such as wireless and wired (physical) connections. Network interfaces 510 are shown separately from power supply 560, however it is appreciated that the interfaces that support PLC protocols may communicate through power supply 560 and/or may be an integral component coupled to power supply 560.

Memory 540 includes a plurality of storage locations that are addressable by processor 520 and network interfaces 510 for storing software programs and data structures associated with the embodiments described herein. In some embodiments, device 500 may have limited memory or no memory (e.g., no memory for storage other than for programs/processes operating on the device and associated caches).

Processor 520 comprises hardware elements or logic adapted to execute the software programs (e.g., instructions) and manipulate data structures 545. An operating system 542, portions of which are typically resident in memory 540 and executed by the processor 520, functionally organizes device 500 by, inter alia, invoking operations in support of software processes and/or services executing on the device 500. These software processes and/or services may include the mobile application 201 that includes the AIMS 140 and associated sub-modules described herein. Note that while mobile application 201 is illustrated in centralized memory 540, alternative embodiments provide for the process to be operated within the network interfaces 510, such as a component of a MAC layer, and/or as part of a distributed computing network environment, a cloud system, etc.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as systems, modules or engines configured to operate in accordance with the techniques herein (e.g., according to the functionality of a similar process). In this context, the term module and engine may be interchangeable and can include software and/or hardware. In general, the term module or engine refers to model or an organization of interrelated software components/functions. Further, while the mobile application 201 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for inferring an action of an individual by identifying hand activities and object manipulation, comprising:
    a wearable device including at least one camera, the wearable device configured to generate video data including a set of image frames captured by the at least one camera from along a wrist of a hand of an individual towards fingers of the hand; and
    a processor in communication with the at least one camera and a memory, the memory including instructions, which, when executed, cause the processor to:
        identify an object within the video data by leveraging a first machine learning (ML) model trained to identify the object by focusing on a presence of the object in one or more image frames of the set of image frames relative to at least one region, the at least one region indicating a focus of attention that reduces search space and supports efficient identification of the object,
        detect a micro-activity from a subset of frames from the set of image frames of the video data by a second machine learning model trained to leverage detection of the object to distinguish the subset of frames from other frames of the set of image frames based on the micro-activity, the micro-activity indicative of some engagement by the individual with the object as detected, and
        infer an action by the individual by focusing along a field of view defining a first focus of attention region associated with the object and a second focus of attention region associated with the individual from the video data, the action predetermined to have occurred due to identification of the object and detection of the at least one micro-activity along the field of view.

2. The system of claim 1, wherein the first focus of attention and the second focus of attention are superimposed along the field of view.

3. The system of claim 1, wherein the memory includes instructions, which, when executed, further cause the processor to:
    detect another micro-activity from another subset of the set of image frames of the video data by the second machine learning model,
    wherein the micro-activity and the another micro-activity are both known indicators that the individual is performing the action.

4. The system of claim 1, wherein the at least one camera is positioned along a ventral side of the wrist with the at least one camera oriented towards the fingers of the hand to capture a position and pose of the hand and the fingers and changes thereof across the set of frames over time.

5. The system of claim 1, wherein the memory includes instructions, which, when executed, further cause the processor to:
- extract one or more feature vectors associated with the object based on the at least one region; and
- train the first machine learning model to recognize the object using the one or more extracted feature vectors of the object.

6. The system of claim 1, wherein the processor leverages heuristic understanding to model each object within the video data as a state machine including one or more nodes and one or more transitions such that for an object detected within the video data, a node of a state machine associated with the object is indicative of a state of an overall activity being performed, and a transition of the state machine associated with the object is indicative of a micro-activity of the overall activity being performed with respect to the object.

7. The system of claim 1, wherein the processor generates a heuristic decision to predict a success of an overall activity by evaluating whether all micro-activities of the overall activity were successfully completed according to the video data.

8. A wearable device for inferring an action of an individual by identifying hand activities and object manipulation, comprising:
- a camera; and
- a processor in operable communication with the camera, configured to:
  - identify an object within video data accessed from the camera by leveraging a first machine learning model configured to identify the object using a region associated with the object,
  - detect a micro-activity from the video data by a second machine learning (ML), and
  - infer an action predetermined to include the object as identified and the micro-activity as detected by focusing on one or more focus of attention regions defined along a field of view from the video data.

* * * * *